United States Patent [19]

Panush

[11] Patent Number: 4,598,020

[45] Date of Patent: Jul. 1, 1986

[54] AUTOMOTIVE PAINT COMPOSITIONS CONTAINING PEARLESCENT PIGMENTS AND DYES

[75] Inventor: Sol Panush, Farmington Hills, Mich.

[73] Assignee: Inmont Corporation, Clifton, N.J.

[21] Appl. No.: 766,237

[22] Filed: Aug. 16, 1985

[51] Int. Cl.$^4$ .......................... C08K 9/02; C08K 9/10; C09B 45/00; C09C 1/28

[52] U.S. Cl. ............... 428/411.1; 427/407.1; 427/407.2; 427/408; 427/409; 428/324; 428/334; 428/443; 428/461; 428/537.1; 428/689; 428/690; 523/171; 523/210

[58] Field of Search .................. 523/171, 210; 427/385.5, 388.1, 407.1, 407.2, 408, 409; 428/324, 334, 443, 461, 537.1, 689, 690, 411.1

[56] References Cited

U.S. PATENT DOCUMENTS

| | | | |
|---|---|---|---|
| 3,639,147 | 2/1972 | Benefiel et al. | 106/304 |
| 4,047,969 | 9/1977 | Armanini | 523/171 |
| 4,146,403 | 3/1979 | Armanini | 523/171 |
| 4,487,869 | 12/1984 | Panush | 524/90 |
| 4,499,143 | 2/1985 | Panush | 428/336 |
| 4,539,238 | 9/1985 | Panush | 428/324 |
| 4,551,491 | 11/1985 | Panush | 524/31 |

*Primary Examiner*—Herbert J. Lilling
*Attorney, Agent, or Firm*—Emil Richard Skula

[57] ABSTRACT

A transparent topcoat coating compositions is described comprising a thermosetting resin material containing a pigment composition and a soluble dye. The pigment composition contains about 40 weight percent to about 80 weight percent of iron oxide encapsulated mica particles. The composition also contains 0.5 weight percent to about 82.5 weight percent of a soluble 1:2 chrome or 1:2 cobalt metal organic complex dye. When used in a multi-coat coating process as a base coat overcoated with a transparent topcoat, an article is produced having improved pearlescent color effects, improved depth and clarity, and resistance to fade from ultraviolet light.

10 Claims, No Drawings

AUTOMOTIVE PAINT COMPOSITIONS CONTAINING PEARLESCENT PIGMENTS AND DYES

TECHNICAL FIELD

The field of art to which this invention pertains is coating compositions, coating methods, and the resultant coated articles.

BACKGROUND ART

Multicoat coating systems are now well known in the coating industry. U.S. Pat. No. 3,639,147 describes such a system for use as an automotive paint. When multicoat coating systems have previously been applied, it has been difficult to obtain coatings having uniformly high gloss while at the same time maintaining good color, and pearlescent features.

In the automotive industry two significant systems are utilized in the painting of automobiles. One topcoat system which utilizes thermoplastic resins is known as the acrylic lacquer system. In this system the base polymers are the homopolymers of methyl methacrylate and copolymers of methyl methacrylate and acrylic acid, methacrylic acid, alkyl esters of acrylic acid or methacrylic acid, vinyl acetate, acrylonitrile, styrene and the like. The acrylic lacquer topcoats have been acknowledged to have outstanding aesthetic properties. Another outstanding topcoat system used in the automotive industry is the thermosetting acrylic resins as described in U.S. Pat. No. 3,375,227, issued Mar. 26, 1968.

These topcoat systems have outstanding chemical resistance, outstanding resistance to cracking and crazing among other outstanding properties, but to the expert paint formulator, the thermosetting acrylic resins have not, in the past, quite provided the aesthetic properties obtained in the acrylic lacquer systems. To overcome the problems associated with the acrylic lacquer topcoats and the thermosetting acrylic resin topcoats, pigmented base coat-clear topcoat multicoat coating systems were developed.

In these systems a pigmented base coat composition is applied to the metal substrate to hide metallic blemishes and provide the aesthetically pleasing colors desired followed by the application of an unpigmented layer of polymer which imparts a "deep" color appearance to the base coat and durability to this pigmented base coat. This system, however, is not without its problems. Aesthetic quality of the coating is totally dependent on the application of the base coat. The clear topcoat magnifies any weakness in this base coat including the highlighting of any color deficiencies of the base coat. The clear coat also acts as a magnifying mirror for ultraviolet radiation which can accelerate rather than retard any degradation of the base coat due to exposure to ultraviolet radiation. In addition, many of these coating systems in use today utilize metal particles in the base coat to provide an aesthetically pleasing metallic appearance. However, problems have occurred with the use of metallic pigments resulting in color loss in the base coat.

In order to overcome the deficiencies of the metallic pigments, pearlescent pigments have been used in the base coat, either with or in place of conventional pigments. Note commonly assigned, copending U.S. patent applications Ser. No. 440,764 filed Nov. 1, 1982, now abandoned and Ser. No. 518,583 filed July 29, 1983, now abandoned. In order to produce novel and improved color effects iron oxide encapsulated mica particles have also been used in a transparent topcoat in a multilayer system. Note commonly assigned copending U.S. patent application Ser. No. 526,724 filed Aug. 26, 1983, now U.S. Pat. No. 4,449,143.

The use of pearlescent pigments produces coating compositions having a metallic-like appearance comparable to, in some respects, conventional metallic pigment coatings. It would be advantageous to produce a multilayer coating wherein the metallic-like appearance is retained while improving the depth, chromaticity, and clarity of the coating.

It is known in the art that the inclusion of dyes in a metallic pigment containing base coat will result initially in improved clarity, chromaticity, and depth. However, these dyes are fugitive in that the dyes tend to fade rapidly upon exposure to ultraviolet radiation. In addition, it is known that metallic flake pigment tends to act as a color reducer and subtracts from chromaticity. That is, an aluminum flake pigment tends to shift the color of a dye or pigment to the gray side or it makes the color look dirty as opposed to being pure.

Accordingly, what is needed in this art are improved coating compositions having a metallic appearance with the advantages of high chromaticity and clarity.

DISCLOSURE OF INVENTION

An improved coating composition is disclosed comprising a thermosetting polymer composition containing about 1% to about 25% by weight of a pigment composition comprising about 5% to about 90% by weight of iron oxide encapsulated mica particles. The improvement comprises the inclusion of about 0.5% to about 82.5% by weight in the pigment composition of a metal organic complex dye selected from the group consisting of 1:2 cobalt metal organic complex dyes and 1:2 chrome metal organic complex dyes. The inclusion of such metal organic complex dyes resulting in a fade-free coating composition.

Another aspect of this invention is a substrate material coated with at least two layers of polymer including a base coat comprising a pigmented thermosetting resin and a transparent topcoat on the base coat comprising a clear thermosetting or thermoplastic resin. The basecoat comprises about 1% to about 25% by weight of a pigment composition comprising about 0.5% to about 82.5% by weight of iron oxide encapsulated mica particles. The improvement comprises the inclusion of about 0.5% to about 82.5% by weight in the pigment composition of a metal organic complex dye selected from the group consisting of 1:2 chrome and 1:2 cobalt metal organic complex dyes in the base coat resulting in a coating which is fade free.

Yet another aspect of the present invention is a method of coating a substrate with multiple layers of polymer. The method comprises applying at least one layer of a base coat of pigmented thermosetting resin to the substrate, applying at least one layer of a transparent thermosetting or thermoplastic topcoat on the base coat and then drying and curing the applied coatings. The pigmented thermosetting resin comprises a pigment composition comprising about 1% to about 25% by weight of a pigment composition comprising about 5% to about 90% by weight of iron oxide encapsulated mica particles. The improvement comprises the inclusion of about 0.5% to about 82.5% by weight in the pigment composition of a metal organic complex dye selected from the group consisting of 1:2 chrome and 1:2 cobalt metal organic complex dyes in the base coat resulting in a fade free coating. (Such a system is defined as Richelyn-Glaze ™).

The foregoing, and other features and advantages of the present invention, will become more apparent from the following description.

BEST MODE FOR CARRYING OUT THE INVENTION

While any substrate material can be coated with the coating compositions according to the present invention, including such things as glass, ceramics, asbestos, wood, and even plastic material depending on the specific drying and/or curing requirements of the particular composition, the coating system of the present invention is particularly adapted for metal substrates, and specifically as an automotive paint finish system. The substrate may also be bare substrate material or can be conventionally primed, for example to impart corrosion resistance. Exemplary meal substrates include such things as steel, aluminum, copper, magnesium, alloys thereof, etc. The components of the composition can be varied to suit the temperature tolerance of the substrate material. For example, the components can be so constituted for air drying (i.e. ambient), low temperature cure (e.g. 150° F.–180° F.), or high temperature cure (e.g. over 180° F.).

The basecoat material, i.e. the pigmented polymer layer closest to the substrate, comprises any suitable film forming material conventionally used in this art including acrylics, alkyds, polyurethanes, polyesters and aminoplast resins. Although the base coat can be deposited out of an aqueous carrier, it is preferred to use conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc. When using volatile organic solvents, although it is not required, it is preferred to include from about 2% to about 50% by weight of a conventional cellulose ester and/or conventional wax which facilitates quick release of the volatile organic solvent resulting in improved flow or leveling out of the coating. The cellulose esters used must be compatable with the particular resin systems selected and include such things as cellulose nitrate, cellulose propionate, cellulose butyrate, cellulose acetate butyrate, cellulose acetate propionate, and mixtures thereof. The cellulose esters when used are preferably used in about 5% to about 20% by weight based on film forming solids.

The acrylic resins in the base coat are thermosetting. Acrylic lacquers such as are described in U.S. Pat. No. 2,860,110 are one type of film in the base coat. The acrylic lacquer compositions typically include homopolymers of methyl methacrylate and copolymers of methyl methacrylate which contain among others, acrylic acid, methacrylic acid, alkyl esters of acrylic acid, alkyl esters of methacrylic acid, vinyl acetate, acrylonitrile, styrene and the like.

When the relative viscosity of the acrylic lacquer polymer is less than about 1105, the resulting films have poor solvent resistance, durability and mechanical properties. On the other hand, when the relative viscosity is increased above the 1.40 level, paints made from these resins are difficult to spray and have high coalescing temperatures.

Another type of film forming material useful in forming the base coat of this invention is a combination of a cross-linking agent and a carboxy-hydroxy acrylic copolymer. Monomers that can be copolymerized in the carboxy-hydroxy acrylic copolymer include esters of acrylic and methacrylic acid with alkanols containing 1 to 12 carbon atoms, such as ethyl acrylate, methyl methacrylate, butyl acrylate, butyl methacrylate, 2-ethylhexyl acrylate, lauryl methacrylate, benzyl acrylate, cyclohexyl methacrylate, and the like. Additional monomers are acrylonitrile, methacrylonitrile, styrene, vinyl toluene, alpha-methyl styrene, vinyl acetate, and so forth. These monomers contain one polymerizable ethylenically unsaturated group and are devoid of hydroxyl and carboxylic groups.

The cross-linking agents used in combinatiion with the hydroxy-carboxy copolymers are those compositions which are reactive with hydroxy and/or carboxylic acid groups. Examples of such cross-linking agents are polyisocyanates (typically di- and/or tri-isocyanates) polyisocyanates, polyepoxides and aminoplast resins. Particularly preferred cross-linking agents are the aminoplast resins.

The polyisocyanates when reacted with hydroxyl bearing polyester or polyether or acrylic polymers will yield urethane films useful in the process of this invention in both the base coat and topcoat. The isocyanate (—NCO)-hydroxyl (—OH) reaction takes place readily at room temperature, so that ambient and low temperature cure is possible.

Among other base coats which are typically used in the processes of the present invention are those commonly known as alkyd resins which are defined to include fatty acid or oil containing esterification products. The methods for preparing these resins are well known in the art.

The preferred alkyd resins useful in this invention are those containing from about 5 to about 65 weight percent of a fatty acid or oil and having an hydroxyl equivalent to caroxy equivalent ratio of from about 1.05 to 1.75. Alkyd resins having less than about 5% fatty compound are classified as the "oil-less" alkyd resins or polyester resins described hereinafter. On the other hand, alkyd resins containing greater than 65% of a fatty compound exhibit poor baking properties, poor chemical resistance and unsatisfactory adhesion to either the base coat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the topcoat of this invention. When this is the case it is preferred that the oil or fatty acid portion of the alkyd resin contain a light colored baking oil or fatty acid such as coconut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the previously described cross-linking agents in the same weight ratios as are used with carboxy-hydroxy copolymers.

Included among the various fatty acids and oils useful in preparing these alkyd resins are the fatty acids derived from the following oils; castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4 butanediol, hexylene glycol, 1,6 hexanediol, the polyglycols such as diethylene glycol or triethylene glycol, etc.; the triols such as glycerine, trimethylol ethane, trimethylol propane, etc, and other higher functiional alcohols such ass pentaerythritol, sorbitol, mannitol, and the like. Acids useful in preparing the alkyd resins of this invention include mono-functional acids such as rosin acids, benzoic acid, para tertiary butyl benzoic acid and the like; the polyfunctional acids such as adipic acid, azelaic acid, sebacic acid, phthalic acid or anhydride, isophthalic acid, terephthalic acid, dimerized and polymerized fatty acids, trimellitic acid, and the like.

Yet another useful base coat is prepared using nonaqueous dispersions such as are described in U.S. Pat. Nos. 3,050,412; 3,198,759; 3,232,903; and 3,255,135. Typically these dispersions are prepared by polymerizing a monomer such as methyl methacrylate in the presence of a solvent in which polymers derived from the above monomer are insoluble and a precursor which is soluble in the solvent. Nonaqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor resistance, durability and mechanical properties. The monomers useful in preparing the above dispersed copolymers or homopolymers are those listed previously as useful in forming the carboxy-hydroxy acrylic copolymers.

In another instance the base coat film can be produced from resins known as polyesters or "oil-less" alkyd resins. These resins are prepared by condensing nonfatty containing polyols and polyacids. Included among the useful polyacids are isophthalic acid, phthalic acid or anhydride, terephthalic acid, maleic acid or anhydridie, fumaric acid, oxlic acid, sebacic acid, azelaic acid, adipic acid, etc. Mono basic acids such as benzoic, para tertiary butyl benzoic and the like can also be utilized. Among the polyalcohols are the diols or glycols such as propylene glycol, ethylene glycol, butylene glycol, 1,4 butanediol, neopentyl glycol, hexalene glycol, 1,6-hexanediol, and the like; the triols such as trimethylol ethane, trimethylol propane and glycerine and various other higher functional alcohols such as pentaerythritol.

Any of the above-recited polymers may be used as the topcoat, as long as it provides a transparent film. The term "transparent film" is defined as a film through which the base coat can be seen. It is preferred that the transparent film contain a UV absorbing compound and/or a hindered amine UV stabilizer and be substantially colorless so that the full polychromatic and aesthetic effect of the base coat is not substantially decreased. However, in some instances, desirable and unique styling effects can be obtained by the addition of contrasting or complementary colors to the topcoat. The outstanding feature of the topcoat is the significant improvement in the durability which is provided to the overall coating composition. The use of the topcoat which covers the pigments in the base coat also provides the opportunity to utilize the iron oxide mica encapsulated mica pigments and dyes of the present invention in the topcoat.

Utilizing the compositions of the present invention offers a means of combining the desirable properties of a combination of resin systems. For example, in appliance finishes the chemical resistance of polyester resins can be combined with the lower cost of thermosetting acrylic resins by applying a polyester clear topcoat over a pigmented thermosetting acrylic base coat. Although any of the above-mentioned thermoplastic materials may be used to form the transparent topcoat, better durability is achieved if the topcoat is one of the above-cited thermosetting materials, i.e. the material containing the cross-linking agents.

In all instances where the above methods and compositions are used extremely high gloss films result. In fact, where with normal two-coat system a 60° gloss in excess of 90-95 is difficult to obtain, using the process of this invention gloss readings in excess of 100 are readily obtained.

The iron oxide encapsulated mica pigments according to the present invention are commercially available from the Mearl Corporation and EM Chemicals, and range in color from golden bronze at the thinnest iron oxide encapsulation through copper, to red at the thickest iron oxide encapsulation. The iron oxide coatings on these pigments being transparent act as natural ultraviolet absorbers. For additional exterior durability (e.g. exposure to the sun) minor amounts of other additives such as chromium hydroxide and titanium dioxide may be included in the iron oxide encapsulation layer. It should also be noted that other high temperature stable metal oxides (such as copper, calcium, cadmium, cobalt, barium, strontium, manganese, magnesium tin and lithium) can be substituted in whole or in part for the encapsulating iron oxide. The iron oxide encapsulation layer is generally in the molecular range of thicknesses representing about 10% to about 85% by weight of the total weight of the encapsulated mica particle, preferably about 20% to about 60%, and typically about 29% to about 48% by weight. If additives such as titanium dioxide or chromium hydroxide are used as part of the encapsulation layer they are generally present in an amount of about 1% to about 35% by weight, and typically about 2% to about 5% for the titanium dioxide, and about 0.1% to about 3.5% by weight for the chromium hydroxide, based on total weight of the encapsulated particle.

The uniformity of shape (platelet) and smoothness of the iron oxide encapsulated mica pigment according to the present invention (e.g. as compared to the highly fragile, three dimensional and complicated configuration of aluminum flake, a standard in the automotive paint industry) eliminates the problem of color drift due to the shear forces (yielding fragmentation problems) in the handling (overhead pumping facilities) and application problems of ghosting, mottling, silkiness and repair color matching.

The iron oxide encapsulated mica pigments are optically pearlescent because their transparency permits light to pass through the particle resulting in a multiplicity of refractions and reflections. In addition to their pearlescence these pigments have inherent hiding capabilities, are additive colors and retain a metallic appearance (face to flop color travel). These features provide the capability of producing colors with depth, clarity and chromaticity not previously attainable with conventional metals (i.e. aluminum) and previous pearlescent pigments (natural or synthetic) which produced colors lacking depth and chromaticity or color travel due to the aesthetics of the metal component (aluminum) or pearl. These colorless and opaque pigments reduced the value (color intensity) of the "true" colored pigments be they organic or inorganic resulting in gray-cloudy-low chroma colors. The addition of the iron oxide encapsulated mica pigments provides hiding and depth to travel with the aesthetically pearlescent appearance.

The iron oxide encapsulated mica pigments are carefully screened and controlled particles. Different sized mica particles will produce different aesthetic appearances. The standard metallized effect utilizes mica pigment having a particle size all within about 5 microns to about 60 microns (preferably about 5 microns to about 45 microns, and typically about 5 microns to about 35 microns) in their largest dimension, and about 0.25 micron to about 1.0 micron in thickness. A satin-like appearance is obtained by using mica pigment having a particle size of about 5 microns to about 40 microns (more typically about 5 microns to about 30 microns and preferably about 5 microns to about 20 microns. The closely controlled particle size provides the transparent, translucent, reflective and refractive features establishing improved aesthetic and physical properties of these coatings through careful selection and blending of these pigments. In a mixture with conventional colored pigments (organic or inorganic) or dyes (natural or synthetic) unique pearlescent colors can be produced. Blending complimentary colors (e.g. red iron oxide encapsulated mica with red pigments or dyes) will produce deep chromatic colors while blending contrasting colors (e.g. bronze iron oxide encapsulated mica with red or blue pigments or dyes) will produce highly chromatic colors with unique undertones. Regardless of the selection, the final (clear coated) enamel will have improved color durability, greater moisture resistance and greater acid resistance than coatings prepared with conventional metals or synthetic pearls.

Conventional metallic flake pigments such as aluminum paste can be added to the base coats of the present invention to increase the hiding of the substrate surface. The addition of small quantities of metallic flake pigment does not effect the fade-free characteristics of the coating compositions of the present invention, however, it produces a metallic effect which is between the conventional metallic appearance and the metallic appearance of the base coats of the present invention. Examples of the conventional metallic pigments which may be used in the base coats of the present invention include conventional aluminum flakes as produced by Silberline Alcoa, Alcan, Reynolds, Eckart, Toyo, etc., referred to as a paste ranging from 55 to 80% nonvolatile in solvent (i.e. mineral spirits, VM&P naptha, etc.).

The dyes which may be used in the base coats of the present invention include any 1:2 chrome or 1:2 cobalt metal organic complex dyes, examples of which are listed in the Table.

TABLE

| C.I. Solvent | Description |
|---|---|
| Yellow 88 | 1:2 chromium complex of an organic molecule with methyl, hydroxyl, and carboxy groups; - neutralized with a branched aliphatic amine with 12 to 14 carbon atoms. |
| Yellow 89 | 1:2 cobalt complex of an organic molecule with methyl, chloride, hydroxyl, and methylsulfonyl groups; - stabilized with dehydroabietylamine. |

TABLE-continued

| C.I. Solvent | Description |
|---|---|
| Yellow 25 | 1:2 cobalt complex of an organic molecule with nitro, hydroxyl, and carboxy groups; - neutralized with soda. |
| Orange 59 | 1:2 chromium complex of an organic molecule with methylsulfonyl, methyl, chloride and hydroxyl groups; - stabilized with dehydroabietylamine. |
| Orange 11 | 1:2 cobalt complex of an organic molecule with nitro, hydroxyl, and methyl groups; - neutralized with soda and cyclohexylamine. |
| Red 9 | 1:2 cobalt complex of an organic molecule with sulfamide and hydroxyl groups; - stabilized with i-propylamine. |
| Black 29 | 1:2 chromium complex of an organic molecule with nitro, hydroxyl, and amyl groups; - neutralized with soda. |
| Violet 24 | 1:2 cobalt complex of an organic molecule with hydroxyl, chloride, and sulfomethylamide groups; - stabilized with cyclohexylamine. |

The 1:2 chrome and 1:2 cobalt metal organic complex dyes are known in the art, for example, 1:2 chrome and 1:2 cobalt metal organic complex dyes are disclosed in U.S. Pat. No. 1,325,841. The dyes are manufactured by reacting or complexing chromium or cobalt with any organic moiety which will complex with the metal in solution, and the complexes are then neutralized and stabilized. Examples of such organic moieties includes phenolic derivitives, pyrazalones, monoazo, disazo, naphthols, and imidazilone. Examples of conventional stabilizers include branched aliphatic amines with 12 to 14 carbon atoms, soda, isopropylamine, cylohexylamine, dehydroabietylamine.

Additional 1:2 chrome and 1:2 cobalt metal organic complex dyes which may be used in the practice of this invention include Solvent Yellow 82 C.I. 18690, Solvent Red 118 C.I. 15675, and Solvent Black 27 C.I. 12195+12197 all of which are chromium complexes containing 1 atom of chromium to 2 mol. dye. These dyes are commercially available from BASF Wyandatte Corporation, Cincinati, Ohio under the Zapon ™ trademark, and have the following structure.

(1) Solvent Yellow 82    ZAPON ™ Yellow 157

A chromium complex of

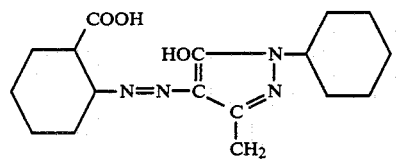

Anthranilic acid→3-Methyl-1-phenyl-5-pyrazolone; then heat with chromium formate in formamide solution for 6 hr. at 113°-115° C. to form the chromium complex which contains 1 atom of chromium per 2 mol. dye.

(2) Solvent Red 118    ZAPON ™ Red 471

A chromium complex derived from

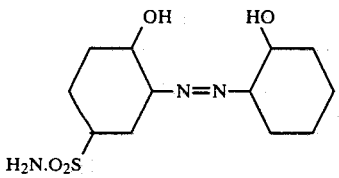

2-Amino-1-phenol-4-sulfonamide→2-Naphthol; then convert to the chromium complex containing 1 atom of chromium to 2 mol. monoazo dye.

(3) Solvent Black 27   ZAPON ™ Black X51

A chromium complex of

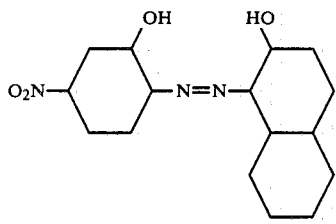

2-Amino-5-nitrophenol→2-Naphthol; then convert to the chromium complex containing 1 atom of chromium to 2 mol. monoazo dye.

Examples of 1:2 cobalt metal organic complex dyes useful in the practice of the present invention include dyes disclosed in European patent application EP 113,643, filed on July 18, 1984 and German Offenlegungsschriftde 3230102A1. Examples of 1:2 chrome metal organic complex dyes useful in the practice of this invention are also disclosed in U.S. Pat. No. 4,340,536. Additional examples of commercially available 1:2 cobalt and 1:2 chrome metal organic complex dyes useful in the practice of this invention include Orasol Yellow 2GLN (Solvent Yellow 88), Orasol Yellow 2RLN (Solvent Yellow 98), Orasol Yellow 3R (Solvent Yellow 25), Orasol Orange G (Solvent Orange 11), Orasol Orange RLN (Solvent Orange 59), Orasol Red 2B (Solvent Red 9), Orasol Violet RN (Solvent Violet 24), and Orasol Black RL (Solvent Black 29). These dyes are manufactured by Ciba-Gigy under the Orasol trademark, Greensboro, N.C.

The amount of pigment in the base coat generally comprises about 1% to about 25% by weight, preferably about 7.5% to about 15% and typically about 10% by weight. About 5% to about 90% of this pigment is the iron oxide encapsulated mica according to the present invention, preferably about 25% to about 70% and typically about 60% by weight.

The amount of dye in the base coat generally comprises about 0.5% to about 82.5% by weight (of the pigment) preferably about 20% to about 60% and typically about 40% by weight. The amount of iron oxide coated mica optionally contained in the base coat generally comprises about 0.5% to about 90% by weight, preferably about 20% to about 80% by weight, and typically about 50% by weight.

The amount of aluminum pigment optionally contained in the base coat generally comprises about 10% to about 38% by weight (of the pigment), preferably about 0.5% to about 10% by weight and typically about 5% to about 18% by weight. The terms "by weight (of the pigment)" and "by weight (of the pigment composition) are defined to mean the weight percentage of the dye as a percentage of the total weight of the pigment or pigment composition.

The novel coating compositions of the present invention incorporate 1:2 chrome or 1:2 cobalt organic complex soluble dyes to produce as aesthetic appearance which is similar to that observed by viewing a stained-glass window or a Tiffany lamp. The appearance is characterized as having depth and clarity or glaze and has never before been attained in an automotive coating.

Mica pigments incorporated into automotive paints as a replacement for aluminum flake produce a metallic-like effect without the disadvantages of aluminum flake such as milky and washed out color, mottling, lack of depth, etc. It is known in the art that organic dyes are unacceptable as a component of automotive paints containing aluminum flake pigment since the dyes are "fugitive" and will rapidly fade upon exposure to ultraviolet light. It is surprising and unexpected that soluble 1:2 chrome and 1:2 cobalt organic complex dyes, when added to the iron oxide coated mica particle pigment containing coating compositions of the present invention, will produce fade-free compositions having new aesthetic visual features never before achieved in automotive coating compositions. These compositions have high chomaticity and depth while having a metallic appearance. The metallic-look coatings of the present invention are observed to have an appearance characterized by brillance and depth of color unachievable in an aluminum flake-containing coating. It is believed that the novel aesthetics of the coatings of the present inention are due to the additive effect of the dye and mica pigment to produce increased chromaticity. The pigment and dye reinforce each other producing intensified colors. On the other hand it is known that aluminum flake is subtractive and will decrease the chromaticity of a dye by shifting the color to a grayer (i.e. dirtier) tone away from the pure color.

It is further surprising and unexpected that the dye when added to base coats containing iron oxide encapsulated mica particles and metal flake pigments will not fade and produce improved chromaticity.

It is additionally surprising and unexpected that only the cobalt/chrome dyes will work in the automotive coatings of the present invention. Other dyes will fade rapidly upon exposure to ultraviolet light.

The chromium or cobalt complex dyes useful in the practice of this invention will comprise any 1:2 chromium or 1:2 cobalt complex organic dye. Chrome complex dyes which can be used in the coatings of the present invention are disclosed in U.S. Pat. No. 4,340,536.

Both the base coat and the topcoat can be applied by any conventional method in this art such as brushing, spraying, dipping, flow coating, etc. Typically spray application is used, especially for automotive finishing. Various types of spraying can be utilized such as compressed air spraying electrostatic spraying, hot spraying techniques, airless spraying techniques etc. These can also be done by hand or by machine.

As stated above prior to application of the coating materials of the present invention a conventional corrosion resistant primer has already been applied. To this primed substrate is applied the base coat. Prior to application of the coating materials of the present invention a conventional corrosion resistant primer typically has already been applied. To this primed substrate is applied the base coat. The base coat is typically applied from about 0.4 mil to about 2.0 mil and preferably about 0.5 mil to about 0.8 mil. This thickness can be applied in a single coating pass or a plurality of passes with very brief drying ("flash") between applications of coats.

Once the base coat has been applied the transparent overcoat is applied after allowing the base coat to flash at ambient temperature for about 30 seconds to about 10 minutes, preferably about 1 to about 3 minutes. While the base coat can be dried for longer periods of time, even at higher temperatures, a much improved product is produced by application of the transparent topcoat after only a brief flash. Some drying out of the base coat is necessary to prevent total mixing of the base coat and topcoat. However, a minimal degree of base coat-topcoat interaction is desirable for improved bonding of the coatings. The topcoat is applied thicker than the base coat (preferably about 1.8 to 2.3 mils) and can also be applied in a single or multiple pass. It should also be noted that the iron oxide encapsulated mica pigments are applicable at low levels in the clear coat and in base coats with tinted clear topcoats. Both applications produce unique aesthetics while retaining the pearlescent appearance.

Pigment control is retained in the base coat while it is being overcoated. This is evidenced by lack of "strike-in" or migration of the two films (the base coat and topcot) into each other. When "strike-in" occurs, pigments move from the base coat into the topcoat, the film compositions become intermixed at the interface and the baked coating composition has a dusty appearance rather than a clear "depth" appearance. By this invention substantially no "strike-in" occurs, and the coatings have outstanding clarity and depth. However, sufficient wetting takes place at the interface so that no problems of delamination and solvent release from either coating are obtained.

Once the topcoat is applied the system is again flashed for 30 seconds to 10 minutes and the total coatings are then baked at temperature sufficient to drive off all of the solvent in the case of thermoplastic layers and at temperatures sufficient to cure and cross-link in the case of thermosetting layers. These temperatures can range anywhere from ambient temperature to about 400° F. Typically in the case of thermosetting material temperatures of about 225° F. to about 280° F. (e.g. 250° F.) are used, (e.g. for about 30 minutes).

The following examples are illustrative of the principles and practice of this invention although not limited thereto. Parts and percentages where used are parts and percentages by weight.

Three iron oxide encapsulated mica pigments are used in the following examples. The Golden Bronze Richelyn ® (Inmont) pigment comprises 62%-68% mica, 29%-35% iron oxide (FE$_2$O$_3$), 3%-5% titanium dioxide (TiO$_2$) and 0.3%-0.9% chromium hydroxide (Cr(OH)$_3$). the Red Richelyn ® pigment comprises 49%-55% mica, 42%-48% iron oxide, 2%-4% titanium dioxide, and 0.3% to 0.9% chromium hydroxide. The Copper Richelyn ® pigment comprises 51%-57% mica, 40%-46% iron oxide, 3%-5% titanium dioxide and 0.3%-0.9% chromium hydroxide. All percents are by weight based on the total weight of the encapsulated pigment. The Golden Bronze Richelyn ® pigment contains a relatively thin layer of iron oxide encapsulation, the Red Richelyn ® pigment contains a relatively thick layer of iron oxide encapsulation, and the Copper Richelyn ® pigment contains a layer of iron oxide encapsulations which is somewhere in between.

The following 1:2 cobalt and 1:2 chrome metal organic complex dyes were used in the following examples: Orasol Yellow 2RLN (Solvent Yellow 89), Orasol Yellow 2GLNL (Solvent Yellow 88), Orasol Yellow 3R (Solvent Yellow 25), and Orasol Orange RLN (Solvent Orange 59). The dyes were manufactured by Ciba-Gigey Corporation, Greensboro, N.C.

EXAMPLE 1

A bronze base coat polymer composition was prepared by blending 144 parts of the copolymer formed by reacting 47 parts of butyl methacrylate, 37 parts of styrene, 15.75 parts of hydroxypropyl methacrylate and 0.25 part of methacrylic acid with 176 parts of xylene and butanol (in a weight ratio of 85/15). A pigment base was prepared by blending 55 parts of Copper Richelyn ® pigment with 45 parts Solvent Yellow 88. This pigment base was blended with the base coat polymer composition in an amount representing 50% by weight of the composition to form the base coat paint composition.

Bonderized steel panels primed with a cured corrosion resistant primer were sprayed with the base coat paint composition to a film thickness of 0.4 to 0.5 mil on a dry film basis. After a flash of approximately 30 to 180 seconds at room temperature, an additional 0.4 to 0.5 mil film of the base coat paint composition again as measured on a dry filml basis was applied by spraying. After a 30 to 180 second flash at room temperature, a transparent top coating was applied by spraying in two coats to a film thickness on dry basis of about 2.0±0.02 mil. The transparent topcoating composition was prepared by blending 144 parts of the copolymer solution described above at 45 percent nonvolatiles with 58 parts of 60 percent nonvolatile solution of butylated methylol melamine. This topcoating composition was applied by spraying to a dry film thickness of about 2.0±0.02 mil. over the base coat described in Example 1 applied to a metal substrate. After drying for 15-30 minutes at room temperature, the coating was baked (cured) at 250° F. for 30 minutes. The resulting coating had a pleasing aesthetic appearance, exhibiting superior polychromatic effects, chromaticity, clarity and depth.

The following pigment combinations were used in the composition of the base coat according to Example 1. In all cases the resultant coating had excellent properties for use as an automotive paint.

The first number (next to the percent pigment) represents the total pigment content of the respective paint composition.

EXAMPLE 2

| % Pigment | 10.0 |
|---|---|
| 45.0 | Solvent Yellow 89 |
| 55.0 | Copper Richelyn ® |
| 100.0 | |

EXAMPLE 3

| % Pigment | 10.0 |
|---|---|
| 22.5 | Solvent Yellow 89 |
| 77.5 | Bronze Richelyn ® |
| 100.0 | |

EXAMPLE 4

| % Pigment | 10.0 |
|---|---|
| 22.5 | Solvent Yellow 89 |
| 77.5 | Copper Richelyn ® |
| 100.0 | |

EXAMPLE 5

| % Pigment | 10.0 |
|---|---|
| 22.5 | Solvent Yellow 89 |
| 22.5 | Phthalocyanine Green by Sun Chemical Corp., Cincinnati, Ohio |
| 55.0 | Bronze Richelyn ® |
| 100.0 | |

EXAMPLE 6

| % Pigment | 10.0 |
|---|---|
| 22.5 | Solvent Yellow 89 |
| 22.5 | Phthalocyanine Green |
| 55.0 | Copper Richelyn ® |
| 100.0 | |

EXAMPLE 7

| % Pigment | 10.0 |
|---|---|
| 22.5 | Solvent Yellow 88 |
| 77.5 | Copper Richelyn ® |
| 100.0 | |

EXAMPLE 8

| % Pigment | 10.0 |
|---|---|
| 22.5 | Solvent Yellow 88 |
| 77.5 | Bronze Richelyn ® |
| 100.0 | |

EXAMPLE 9

| % Pigment | 10.0 |
|---|---|
| 22.5 | Solvent Yellow 25 |
| 77.5 | Copper Richelyn ® |
| 100.0 | |

EXAMPLE 10

| % Pigment | 10.0 |
|---|---|
| 22.5 | Solvent Yellow 25 |
| 77.5 | Bronze Richelyn ® |
| 100.0 | |

EXAMPLE 11

| % Pigment | 10.0 |
|---|---|
| 22.5 | Solvent Yellow 25 |
| 22.5 | Phthalocyanine Green |
| 55.0 | Bronze Richelyn ® |
| 100.0 | |

EXAMPLE 12

| % Pigment | 10.0 |
|---|---|
| 22.5 | Solvent Yellow 59 |
| 22.5 | Phthalocyanine |
| 55.0 | Copper Richelyn ® |
| 100.0 | |

The compositions and processes according to the present invention provide many improvements over the paint compositions and processes of the prior art. It is surprising and unexpected that soluble metal organic complex dyes can be added to an automotive base coat paint composition and remain fade free when exposed to ultraviolet radiation. By utilizing the coating compositions and processes of the present invention, it is possible to get metal-like appearing coating compositions with colors and appearances never before produced. The coatings have novel chromaticity, translucency, and clarity comparable to the aesthetic effect observable when looking at a stained glass window or a Tiffany lamp. The synergistic effect of the mica particles with the metal organic complex dyes is believed to be responsible for the novel aesthetic effects possessed by the coatings of the present invention. When incorporated into the thermosetting polymer containing composition and subjected to heat sufficient to cure the thermosetting polymer the dye "reacts" with the polymer becoming an integral part of the system eliminating the natural "bleeding" tendency of the dye and becoming insoluble in the enamel. This dye dissolves in solvent, like "true" conventional dyes but reacts like a "true" pigment when added to the enamel, becoming coated and protected by the polymer system. It is in this unity with the polymer system that the "reaction" with the polymer occurs. Conventional dyes never become part of the enamel. They remain free and exposed to "bleeding" (sensitivity to attack from solvents, enamels, etc., coming in contact with them). It is postulated that the chromium or cobalt ion complex takes part in the catalyzed thermosetting reaction yeilding a tightly knitted, non-bleeding system.

The applied compositions are not moisture sensitive, use relatively small particle size, are less sensitive to criticality of applications, maintain color trueness at all angles (face to flop color travel) can withstand the elements (i.e., sun exposure), do not operate with substractive color effects when mixed with other pigments, allow low bake repair color matching, and resist settling and chemical (e.g., acid rain) attack.

It should be noted that while the compositions of the present invention are particularly adapted to original equipment manufacture coatings for automobiles, one of their advantages is the low bake matching use as thermosetting refinish compositions as well. Whereas in the original equipment manufacture, the disclosed cellulose esters are typically used, such are not universally required for example in refinish compositions.

Although this invention has been shown and described with respect to detailed embodiments thereof, it will be understood by those skilled in the art that various changes in form and detail thereof may be made without departing from the spirit and scope of the claimed invention.

I claim:

1. A pearlescent coating composition comprising thermoplastic or thermosetting resin containing about 1% to about 25% by weight of a pigment composition comprising about 5% to about 90% by weight of iron oxide encapsulated mica particles, wherein the improvement comprises the inclusion of about 0.5 weight percent to about 82.5 weight percent (of the pigment composition) in the coating of a metal organic complex dye selected from the group consisting of 1:2 cobalt metal organic complex dyes and 1:2 chrome metal organic complex dyes, the inclusion of such metal organic complex dyes resulting in a fade-free coating composition.

2. The coating composition of claim 1 wherein the pigment composition additionally comprises about 0.5 weight percent to about 18 weight percent of a metallic flake pigment.

3. The coating composition of claim 1 wherein the metal organic complex dye is selected from the group consisting of C.I. Solvent Yellow 88, C.I. Solvent Yellow 89, C.I. Solvent Yellow 25, C.I. Solvent Orange 11, C.I. Solvent Orange 59, C.I. Solvent Red 7, C.I. Solvent Violet 24, and C.I. Solvent Black 29.

4. The composition of claim 1 wherein the thermosetting resin is an acrylic resin.

5. A substrate material coated with at least two layers of polymer including a base coat comprising a pigmented thermosetting resin and a transparent topcoat on the base coat comprising a clear thermosetting or thermoplastic resin, the pigmented thermosetting resin comprising about 1% to about 25% by weight of a pigment composition comprising about 5% to about 90% by weight of iron oxide encapsulated mica particles, wherein the improvement comprises the inclusion of about 0.5 percent to about 82.5 percent by weight (of the pigment composition) of a metal organic complex dye selected from the group consisting of 1:2 chrome or 1:2 cobalt metal organic complex dye in the base coat resulting in a coating which is fade free.

6. The substrate material of claim 5 wherein the pigment composition additionally comprises about 0.5 weight percent to about 18 weight percent of a metallic flake pigment.

7. The substrate material of claim 5 wherein the metal organic complex dye is selected from the group consisting of C.I. Solvent Yellow 88, C.I. Solvent Yellow 89, C.I. Solvent Yellow 25, C.I. Solvent Orange 11, C.I. Solvent Orange 59, C.I. Solvent Red 7, C.I. Solvent Violet 24 and C.I. Solvent Black 29.

8. A method of coating a substrate with multiple layers of polymer comprising applying at least one layer of a base coat of pigmented thermosetting resin to the substrate, applying at least one layer of a transparent thermosetting or thermoplastic topcoat on the base coat, and drying and curing the applied coatings, the pigmented thermosetting resin comprising about 1% to about 25% by weight of a pigment composition comprising about 5% to about 90% by weight of iron oxide encapsulated mica particles, wherein the improvement comprises the inclusion of about 0.5 weight percent to about 82.5 weight percent by weight (of the pigment composition) of a metal organic complex dye selected from the group consisting of 1:2 chrome and 1:2 cobalt metal organic complex dyes in the base coat resulting in a fade free coating.

9. The method of claim 8 wherein the metal organic complex dye is selected from the group consisting of C.I. Solvent Yellow 88, C.I. Solvent Yellow 89, C.I. Solvent Yellow 25, C.I. Solvent Orange 11, C.I. Solvent Orange 59, C.I. Solvent Red 7, C.I. Solvent Violet 24 and C.I. Solvent Black 29.

10. The method of claim 8 wherein the pigment composition additionally comprises about 0.5 weight percent to aobut 18 weight percent of a metallic flake pigment.

* * * * *